US006597709B1

(12) United States Patent
Diver, Jr.

(10) Patent No.: US 6,597,709 B1
(45) Date of Patent: Jul. 22, 2003

(54) METHOD AND APPARATUS FOR ALIGNING A SOLAR CONCENTRATOR USING TWO LASERS

(75) Inventor: Richard Boyer Diver, Jr., Albuquerque, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 182 days.

(21) Appl. No.: 09/679,355

(22) Filed: Oct. 5, 2000

(51) Int. Cl.⁷ ................................................ H01S 3/10
(52) U.S. Cl. ...................................... 372/9; 372/107
(58) Field of Search ................................. 372/9, 107

(56) References Cited

U.S. PATENT DOCUMENTS

| | | | |
|---|---|---|---|
| 4,219,729 A | | 8/1980 | Smith ........................ 250/203 |
| 4,354,484 A | | 10/1982 | Malone et al. .............. 126/425 |
| 4,440,150 A | | 4/1984 | Kaehler ....................... 126/425 |
| 5,100,229 A | | 3/1992 | Lundberg et al. ............... 356/1 |
| 5,110,202 A | | 5/1992 | Dornbusch et al. ............. 356/1 |
| 5,269,288 A | * | 12/1993 | Stirbl et al. .................. 126/714 |
| 5,655,832 A | * | 8/1997 | Pelka et al. .................. 362/296 |
| 5,982,481 A | * | 11/1999 | Stone et al. ............. 356/152.2 |
| 6,225,551 B1 | * | 5/2001 | Lewandowski ............. 136/246 |

OTHER PUBLICATIONS

R. Diver, "Mirror Alignment Techniques for Point–Focus Solar Concentrators," Sandia National Laboratories, SAND92–0668, Jun. 1992.

J. Blackmon, et al., "Application of the digital Image Radiometer to Optical Measurement and allignment of Space and Terrestrial solar Power Systems," 28ᵗʰ Intersociety Energt Conversion Engineering Conference Proceedings, vol. 2, pp. 2.563–2.570, Aug. 1993.

R. Diver, "Mirror Alignment and Focus of Point–Focus Concentrators," Proceedings of the 1995 ASME/JSME/JSES International Solar Energy Conference,, pp. 1–8, Mar. 1995.

* cited by examiner

Primary Examiner—Paul Ip
Assistant Examiner—Phillip Nguyen
(74) Attorney, Agent, or Firm—Dickson G. Kehl; James C. Durkis; Paul A. Gottlieb

(57) ABSTRACT

A method and apparatus are provided for aligning the facets of a solar concentrator. A first laser directs a first laser beam onto a selected facet of the concentrator such that a target board positioned adjacent to the first laser at approximately one focal length behind the focal point of the concentrator is illuminated by the beam after reflection thereof off of the selected facet. A second laser, located adjacent to the vertex of the optical axis of the concentrator, is used to direct a second laser beam onto the target board at a target point thereon. By adjusting the selected facet to cause the first beam to illuminate the target point on the target board produced by the second beam, the selected facet can be brought into alignment with the target point. These steps are repeated for other selected facets of the concentrator, as necessary, to provide overall alignment of the concentrator.

6 Claims, 1 Drawing Sheet

METHOD AND APPARATUS FOR ALIGNING A SOLAR CONCENTRATOR USING TWO LASERS

CONTRACTUAL ORIGIN OF THE INVENTION

The United States Government has rights in this invention pursuant to Contract Number DE-AC04-94AL85000 between the United States Department of Energy and Sandia National Laboratories.

BACKGROUND OF THE INVENTION

1. Field of the Invention

The present invention relates to the optical alignment of solar concentrators, more particularly, to a method and apparatus for the alignment of solar concentrators using two lasers.

2. Related Art

A variety of techniques exist for providing a solar concentrator alignment. These techniques include on-sun alignment, distant observer alignment, distant light source alignment, conventional laser alignment, and near light source alignment.

In on-sun alignment, individual mirrors are aligned while the concentrator tracks the sun. This technique is limited in usefulness in that it must be performed during sunny days and any error in tracking can translate into significant alignment errors.

With the distant observer approach, a "bulls-eye" type target, located near the focus of the concentrator, is observed in a reflection from the concentrator at a distance. Mirrors are individually adjusted to maximize the "bulls-eye" color seen in the concentrator by the observer.

In the distant light source technique, the concentrator is illuminated by a lamp located at a known distance of approximately 500 to 2000 feet along the optical axis of the concentrator. The location and shape of the reflected images on a target, of specified location near the focus of the concentrator, is then adjusted to correspond to the calculated locations drawn on the target. This technique is limited by the fact that it can only be performed at night.

In conventional laser alignment, a laser is located near the "2f" location of the concentrator, i.e., one focal length behind the concentrator focal point. As in the distant light source technique, the mirrors are adjusted to align the reflected laser beam on calculated, predetermined locations on a target board, as located near the "2f" location. Laser alignment can be accomplished day or night.

The near light source technique is similar to conventional laser alignment with respect to target and light source location. It differs in that a lamp is used instead of a laser, and the entire concentrator is illuminated. However, because of the overlap of reflected images on the target, this approach is limited to concentrators that can be defocused.

These abovementioned techniques are described in more detail in Richard B. Diver, "Mirror Alignment Techniques for Point-Focus Solar Concentrators," SAND92-0668, Sandia National Laboratories, Albuquerque, N.Mex., June, 1992 and Richard B. Diver, "Mirror Alignment and Focus of Point-Focus Concentrators," Proceedings of the 1995 ASME/JSME/JSES, International Solar Energy Conference, Maui, Hi., March, 1995.

Of the techniques described above, only the conventional laser technique represents a practical approach for most commercial systems. The laser technique can be performed both day and night and is not hindered by line-of-sight access limitations-typically seen in a large field of dishes where some dishes' line-of-sight access will be completely blocked by surrounding dishes. However, the conventional laser technique also has some disadvantages. These disadvantages include misalignments due to the effect of level slope errors when only a single alignment sampling takes place. Also, the conventional laser technique requires exact positioning of the alignment target, along with precise knowledge of concentrator facets and aim point coordinates. Furthermore, variations between individual solar concentrators can result in the requirement that unique targets must be made for each one-resulting in added expense.

Based on the limitations of the aforementioned alignment techniques, their remains a need for a solar concentrator alignment technique that (1) is simple to set up and implement, (2) uses a minimal amount of sophisticated hardware, (3) does not require the removal of existing hardware on the concentrator, (4) does not require use of the sun or restrictive weather conditions, (5) does not require line-of-sight to a distant observer or distant light source and (6) permits real-time alignment of concentrator facets while the concentrator remains in operation.

SUMMARY OF THE INVENTION

In accordance with the invention, a method and apparatus are provided which use a laser alignment approach but which provides important advantages over conventional laser alignment systems and methods. As discussed in more detail below, the method and apparatus of the invention share the important practical advantages of conventional laser alignment techniques—including the ability to perform during both the day and night—while eliminating or greatly reducing problems associated with conventional laser techniques.

In accordance with one aspect of the invention, an apparatus is provided for aligning a solar concentrator having a plurality of facets, the concentrator defining a focal point and an optical axis having a vertex, and the apparatus comprising: a first laser for producing a first laser beam for targeting a selected facet of the plurality of facets of the concentrator; a target board positioned adjacent to the first laser at approximately one focal length behind the focal point of the concentrator such that the target board will be illuminated by the first laser beam from the first laser after reflection of the first laser beam off of the selected facet; and a second laser, located adjacent to the vertex of the optical axis of the concentrator, for producing a second laser beam directed at the target board at a target point thereon such that by adjusting the selected facet to cause the first laser beam to illuminate the target point on the target board produced by the second laser beam, the selected facet can be brought into the desired alignment.

Preferably, the apparatus further comprises a first steerable mirror associated with the first laser for steering the first laser beam and a second steerable mirror associated with the second laser for steering the second laser beam.

Advantageously, the first and second laser beams produced by the first and second lasers are of different colors so as to enable the beams to be distinguished from one another.

In accordance with a further aspect of the invention, a method is provided for aligning a solar concentrator having a plurality of facets, the concentrator defining a focal point and an optical axis having a vertex, and the method comprising: (a) using a first laser to direct a first laser beam onto a selected facet of the plurality of facets of the concentrator such that a target board positioned adjacent to the first laser at approximately one focal length behind the focal point of the concentrator is illuminated by the first laser beam after reflection thereof off of the selected facet; (b) using a second laser, located adjacent to the vertex of the optical axis of the concentrator, to direct a second laser beam onto the target board at a target point thereon; (c) adjusting the selected facet to cause the first laser beam to illuminate the target point on the target board produced by the second laser beam, so as to bring the selected facet into alignment with the target point; and repeating steps (a) to (c) for other selected facets of the concentrator, as necessary, to provide the desired alignment of the concentrator. It should be noted that by using this method, the resulting alignment could correspond with the focal point of the concentrator, or if desired, due to operational considerations, could result in individual facets being aligned in order to tailor the energy flux distribution at the concentrator focal point.

As above, the method preferably comprises using a first steerable mirror for directing the first laser beam and a second steerable mirror for directing the second laser beam, and the first and second laser beams produced by the first and second lasers are preferably of different, distinguishable colors.

Further features and advantages of the present invention will be set forth in, or apparent from, the detailed description of preferred embodiments thereof which follows.

BRIEF DESCRIPTION OF THE DRAWINGS

The single FIGURE in the drawings is a schematic diagram of a preferred embodiment of the dual laser concentrator alignment system of the invention.

DESCRIPTION OF THE PREFERRED EMBODIMENTS

Figure 1:
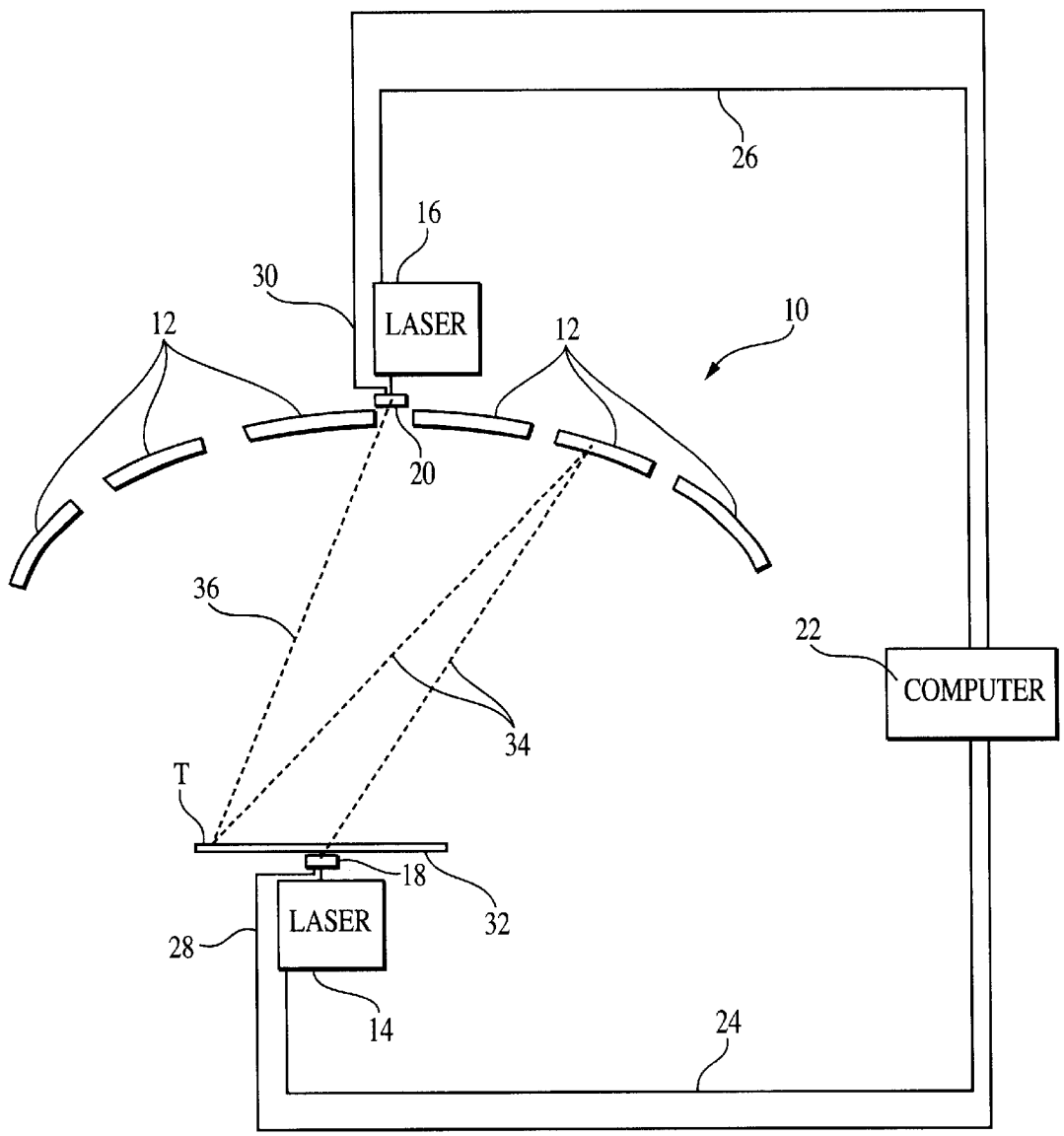

Referring to the drawings, there is depicted a solar concentrator 10 incorporating the two laser alignment system of the invention. The solar concentrator 10 comprises a plurality of facets 12. The solar concentrator is equipped with two lasers, a first, "actual position" laser 14 and a second target laser 16. The laser beam produced by actual position laser 14 is directed using an associated steerable mirror 18. The beam produced by target laser 16 is similarly directed using a further steerable mirror 20. A computer 22 controls the actual position laser 14 and the target laser 16 through respective electrical connections 24 and 26. The computer 20 also controls the steerable mirrors 18 and 20 through further electrical connections 28 and 30, respectively. In addition, a target board 32 is provided as indicated.

The first, actual position laser 14 is located approximately one focal length behind the focal point of concentrator 10. The exact location is not critical as long as the location is known. The primary consideration in the placement of the actual position laser 14 is that the placement thereof must be such that the reflection of a first laser beam, e.g., beam 34, from any one of the plurality of facets 12 of the concentrator must illuminate a point on the target board 32. Accordingly, the larger the target board 32, the more latitude there is in the placement of the actual position laser 14 (and the target board 32). As illustrated, the first beam of light 34, produced by actual position laser 14, is directed by associated steerable mirror 18 onto a selected one of the plurality of facets 12 of the concentrator 10. The beam 34 is reflected back toward the target board 32 by the selected one of the plurality of facets 12 and the point on the target board 32 illuminated by the first beam of light 34 provides an indication of the actual, current alignment position of the targeted one of the plurality of facets 12.

The target laser 16 is located near the vertex 42 of concentrator 10 along the optical axis 44 of the concentrator and points toward the focal point 46 of the concentrator 10 and toward the target board 32. By the use of the extremely fine angular resolution provided by commercially available scanning mirrors and lasers, and only a limited number of distance measurements, it is possible to accurately define all of the critical locations needed, e.g., mirror coordinates, target location, aim points and laser locations, in a self-consistent coordinate system. Then, using previously developed and known computer software, it is possible to predict a theoretically optimum point where the laser beam 34 transmitted from the actual position laser 14 and reflected from any one of the plurality of facets 12 should fall onto and illuminate the target board 32. The target laser 16 is adjusted accordingly and transmits a second laser beam, indicated at 36, to illuminate the theoretically optimum point on the target board 32. The selected one of the plurality of facets 12 is then adjusted to redirect the first laser beam 34 to illuminate the same point on the target board 32 illuminated by the second laser beam 36. Preferably, the two laser beams 34 and 36 are of different, distinguishable colors to help the user differentiate between the target laser 16 from the actual position laser 14.

The computer 22 synchronizes the operation of the lasers 14 and 16 and the respective associated steerable mirrors 18 and 20 and calculates the theoretical location on target board 32 at which the target laser 16 should be aimed. Different patterns, e.g., a star, circle or the like, can be used to capture a representative area of the facet being aligned. Precise calibrations can be performed using the steerable mirrors 18 and 20 in determining angular location, and using range finders or even tape measures in determining distances.

The two-laser technique of the invention provides definite advantages over the conventional laser technique. Similar to the conventional technique, the two-laser technique can be performed day or night and does not require light-of-sight access by a distant observer. However, the two-laser technique enables sampling at more than one point on a mirrored facet. Accordingly, the effects of local slope errors, which can bias mirror alignment when doing only a single sampling, can be eliminated. As stated above, the prior art laser technique also requires precise positioning of the concentrator and precise definition of the target relative to the concentrator, and precise definition of the concentrator facet and aim point coordinates because the target is created in advance, and concentrator to concentrator variations can also result in alignment errors. With the two-laser technique of the invention, the target is created as the alignment is performed. Thus, painstaking fixturing techniques of the conventional method are eliminated.

Also, as indicated above, with the use of the angular measurement coordinates of the steerable scanning mirrors 18 and 20 and a limited number of distant measurements, it is possible to survey all of the necessary coordinates for inputting to the alignment software for guiding the target laser 16.

It is noted that ground alignment of dish modules before assembly is also possible with the two-laser approach of the invention. Alignment would be carried out when the facet support structure (not shown) is assembled on the ground, prior to lifting of the structure onto the support pedestal. Because of the ability of the invention to perform calculations in situ and because the alignment software can account for off-axis conditions, only rough fixturing is needed. In other words, it is not necessary to accurately fixture targets since the lasers and software take positions into account. The positions of the targets, etc. are constrained only by light-of-sight considerations and the need to return reflections to the target.

Although the invention has been described above in relation to preferred embodiments thereof, it will be understood by those skilled in the art that variations and modifications can be effected in these preferred embodiments without departing from the scope and spirit of the invention.

What is claimed is:

1. An apparatus for aligning a solar concentrator having a plurality of facets, said solar concentrator defining a focal point and an optical axis having a vertex, and said apparatus comprising:

a first laser for producing a first laser beam for targeting a selected facet of said plurality of facets of said solar concentrator;

a target board positioned adjacent to said first laser at approximately one focal length behind said focal point of said solar concentrator such that said target board will be illuminated by said first laser beam from said first laser after reflection of said first laser beam off of said selected facet; and a second laser, located adjacent to said vertex of the optical axis of the concentrator, for producing a second laser beam directed at said target board at a target point thereon such that by adjusting said selected facet to cause said first laser beam to illuminate the target point on the target board produced by the second laser beam, the selected facet can be brought into alignment with said focal point.

2. An apparatus according to claim 1 further comprising a first steerable mirror associated with said first laser for steering said first laser beam and a second steerable mirror associated with said second laser for steering said second laser beam.

3. An apparatus according to claim 1 wherein said first and second laser beams produced by said first and second lasers are of different colors.

4. A method for aligning a solar concentrator having a plurality of facets, said solar concentrator defining a focal point and an optical axis having a vertex, said apparatus comprising:

(a) operating a first laser to direct a first laser beam onto a selected facet of said plurality of facets of the concentrator such that a target board positioned adjacent to said first laser at approximately one focal length behind said focal point of the concentrator is illuminated by said first laser beam after reflection thereof off of said selected facet;

(b) operating a second laser, located adjacent to said vertex of the optical axis of the concentrator, to direct a second laser beam onto said target board at a target point thereon;

(c) adjusting said selected facet to cause said first laser beam to illuminate said target point on said target board produced by said second laser beam, so as to bring said selected facet into alignment with said focal point; and (d) repeating steps (a) to (c) for other selected facets of the concentrator, as necessary, to provide desired alignment of said concentrator.

5. A method according to claim 4 further comprising using a first steerable mirror for directing said first laser beam and a second steerable mirror for directing said second laser beam.

6. A method according to claim 4 wherein said first and second laser beams produced by said first and second lasers are of different colors.

* * * * *